United States Patent [19]
Watanabe et al.

[11] Patent Number: 4,965,503
[45] Date of Patent: Oct. 23, 1990

[54] POSITIONAL INFORMATION GENERATING APPARATUS AND CODE MEANS THEREFOR

[75] Inventors: Tsuneo Watanabe; Kouzou Okada, both of Yokohama, Japan

[73] Assignee: Tokyo Keiki Co., Ltd., Tokyo, Japan

[21] Appl. No.: 328,013

[22] Filed: Mar. 23, 1989

[30] Foreign Application Priority Data

Mar. 23, 1988 [JP] Japan ............................ 63-068509

[51] Int. Cl.$^5$ ............................................ G05B 11/01
[52] U.S. Cl. ................................. 318/671; 341/13; 375/37; 324/533
[58] Field of Search ......................... 318/671; 341/13; 375/37; 324/58.5 B

[56] References Cited

U.S. PATENT DOCUMENTS

| 4,041,381 | 8/1977 | Hwa | 324/533 |
| 4,604,521 | 8/1986 | Takekoshi et al. | 341/13 |
| 4,628,298 | 12/1986 | Hafle et al. | 341/13 |
| 4,633,224 | 12/1986 | Gipp et al. | 341/13 |
| 4,642,810 | 2/1987 | Picard | 375/37 |

OTHER PUBLICATIONS

International Publication No. WO86/00478 (International Application No. PCT/US85/0118) which corresponds to Japanese Publication No. 61-502512 listed above.

Primary Examiner—William M. Shoop, Jr.
Assistant Examiner—Saul M. Bergmann
Attorney, Agent, or Firm—Lowe, Price, Leblanc, Becker & Shur

[57] ABSTRACT

A positional information generating apparatus comprises a code disposed on a main track on which M-sequence codes form a cyclic code of different code words, and sensors disposed for attaining relative movement with reference to a direction of the main track. The code word is detected from the main track by the sensors for generating positional information. A sensor array for the main track in which a greater number of sensors than the number of elements of a code word are disposed over a span corresponding to a length of one code word in such a way that at least one sensor is located on each code element to define a code word to be read. A relative position detector is provided for detecting a relative positional relationship between the sensor array for the main track and the main track. A sensor selecting circuit selects a sensor for each code element from the sensor array for the main track, which is in a position to detect the code element, based on the detection signal from the relative position detector, and allows transmission of the detection signal from said sensor. A main track includes a cyclic code of different code words disposed thereon, and a sub-track includes discrimination elements arranged cyclically along the main track.

9 Claims, 10 Drawing Sheets

FIG. 5

| Position (Decimal) | Sub-track | | Main Track | | | | M-sequence Code | | |
|---|---|---|---|---|---|---|---|---|---|
| | S0 | S1 | M0 | M1 | M2 | M3 | ch0 | ch1 | ch2 |
| 0 | 0 | 0 | × | 0 | 0 | 0 | 0 | 0 | 0 |
| 1 | 0 | 1 | 0 | × | 0 | 0 | | | |
| 2 | 1 | 1 | 0 | 0 | × | 0 | | | |
| 3 | 1 | 0 | 0 | 0 | 0 | × | | | |
| 4 | 0 | 0 | × | 0 | 0 | 1 | 0 | 0 | 1 |
| 5 | 0 | 1 | 0 | × | 0 | 1 | | | |
| 6 | 1 | 1 | 0 | 0 | × | 1 | | | |
| 7 | 1 | 0 | 0 | 0 | 1 | × | | | |
| 8 | 0 | 0 | × | 0 | 1 | 0 | 0 | 1 | 0 |
| 9 | 0 | 1 | 0 | × | 1 | 0 | | | |
| 10 | 1 | 1 | 0 | 1 | × | 0 | | | |
| 11 | 1 | 0 | 0 | 1 | 0 | × | | | |
| 12 | 0 | 0 | × | 1 | 0 | 1 | 1 | 0 | 1 |
| 13 | 0 | 1 | 1 | × | 0 | 1 | | | |
| 14 | 1 | 1 | 1 | 0 | × | 1 | | | |
| 15 | 1 | 0 | 1 | 0 | 1 | × | | | |
| 16 | 0 | 0 | × | 0 | 1 | 1 | 0 | 1 | 1 |
| 17 | 0 | 1 | 0 | × | 1 | 1 | | | |
| 18 | 1 | 1 | 0 | 1 | × | 1 | | | |
| 19 | 1 | 0 | 0 | 1 | 1 | × | | | |
| 20 | 0 | 0 | × | 1 | 1 | 1 | 1 | 1 | 1 |
| 21 | 0 | 1 | 1 | × | 1 | 1 | | | |
| 22 | 1 | 1 | 1 | 1 | × | 1 | | | |
| 23 | 1 | 0 | 1 | 1 | 1 | × | | | |
| 24 | 0 | 0 | × | 1 | 1 | 0 | 1 | 1 | 0 |
| 25 | 0 | 1 | 1 | × | 1 | 0 | | | |
| 26 | 1 | 1 | 1 | 1 | × | 0 | | | |
| 27 | 1 | 0 | 1 | 1 | 0 | × | | | |
| 28 | 0 | 0 | × | 1 | 0 | 0 | 1 | 0 | 0 |
| 29 | 0 | 1 | 1 | × | 0 | 0 | | | |
| 30 | 1 | 1 | 1 | 0 | × | 0 | | | |
| 31 | 1 | 0 | 1 | 0 | 0 | × | | | |

| Relative Positions | Signals from Sub-track Sensors | | Effective Sensors | | |
|---|---|---|---|---|---|
| | $S_0$ | $S_1$ | $SW_0$ | $SW_1$ | $SW_2$ |
| 0 | 0 | 0 | $M_1$ | $M_2$ | $M_3$ |
| 1 | 0 | 1 | $M_0$ | $M_2$ | $M_3$ |
| 2 | 1 | 1 | $M_0$ | $M_1$ | $M_3$ |
| 3 | 1 | 0 | $M_0$ | $M_1$ | $M_2$ |

POSITIONAL INFORMATION GENERATING APPARATUS AND CODE MEANS THEREFOR

FIELD OF THE INVENTION

This invention relates to a positional information generating apparatus having a track on which M. sequence code patterns are provided for reading codes from the track by sensors to generate absolute positional information and to a code means for use with the apparatus.

RELATED ART

An apparatus for generating absolute positional information such as an absolute encoder is advantageously capable of generating positional information at any given position without cumulative counting from a reference position as needed in an incremental encoder.

The absolute encoder, however, is needed to have an increased number of code generating tracks to improve the resolution of the positional information to be generated. This disadvantageously increases a physical size (for example, diameter) of the apparatus.

The absolute encoder of this type usually has a multi-track code means and has another disadvantage in that allowance of offset of code marking is very small because it is a product of allowances of offset of the respective tracks. This allowance must be made further smaller to improve the resolution. For this reason, the code array should be manufactured or assembled with high accuracy and the entire cost of the absolute encoder should inevitably be high.

To solve these problems, there has been proposed a positional information generating apparatus of a small size but of a high resolution, which employs a cyclic code system such as M-sequence, i.e., Maximum Length Sequence system. The cyclic code is formed of circulating sequence consisting, for example, of $2^{m-1}$ "1" and "0" arranged to form $2^m$ different code groups in units of m. An extended M-sequence code is formed by including the zero ("0") position code element. The period of this extended M-sequence code is $2^m$ code elements as an additional code element, the zero position code element, has been included with the $2^m - 1$ period of the non-extended M-sequence code. The term "M-sequence code system" or similar phraseology used to describe the present invention refers to the extended M-sequence code.

As the positional information generating apparatus employing the cyclic code system, there has been known an apparatus disclosed, for example, in Japanese Patent Publication (Kokoku) No. 31-8188. In this apparatus, $2^m$ codes forming the circulating sequence are expressed in patterns of optical or magnetic changes or changes in conductivity or electrostatic capacity, which are readable by optical or magnetical sensors or sensors which are capable of detecting changes in conductivity or electrostatic capacity. The codes are disposed on a code track to form code means, while being associated with positions to be represented thereby. Adjacent m code elements are sequentially read out from the code means by the sensors to detect corresponding m-unit codes to obtain absolute positional information. Such a track is provided, for example, on a rotary plate, so that the code elements may be read by the sensors. Thus, a rotary encoder is provided.

However, this apparatus has a fatal defect in that the code word to be detected can not be defined when the sensor is located on a boundary portion between the adjacent code elements arranged on the track. In this case, the position detection can not be attained. Thus, this apparatus can not be practicable.

To obviate this defect of the prior art, there has been proposed an apparatus as disclosed in National Publication of Japanese Patent Application (under PCT) No. 61-502512. This apparatus has a code means comprising a main track formed of M-sequence codes and a synchronizing track for synchronization and further has sensors arranged for the main track and the synchronizing track.

In this apparatus, the main track and the sensors move relatively with respect to each other and a series of code elements forming code words for providing positional information which is each formed of m code elements and the code elements are sequentially read out by the sensors arranged for the main track. According to this apparatus, the positional information is read when m code elements defining the code word for providing the positional information. Thus, the apparatus can not detect the positional information at a read starting time, until at least m code elements defining the code word are read.

The present invention has been made to solve the problems as described above for providing a positional information generating apparatus which is of high resolution and of small size and easy to form code elements. It is therefore an object of the present invention to provide a positional information generating apparatus which avoids the possibility that the positional information can not be detected due to location of the sensor at a boundary position and is capable of detecting the positional information immediately after starting of reading.

It is another object of the present invention to provide a code means for a positional information generating apparatus which is of high resolution and of small-size and easy to form code patterns.

BRIEF SUMMARY OF THE INVENTION

The present invention features a positional information generating apparatus and comprises code means having a main track on which M-sequence codes forming a chain of different code words, and sensor means disposed for attaining relative movement with reference to a direction of the main track are provided, whereby the code word is detected from the main track by the sensor means for generating positional information, which apparatus comprises; a sensor array for the main track in which sensors greater in number than the number of code elements forming one code word disposed over a span corresponding to a length of one code word in such a way that at least one sensor may be located on each code element which defines a code word to be read so as to assure detection of the code element; a relative position detecting means for detecting a relative positional relationship between the sensor array for the main track and the main track; and a sensor selecting circuit which selects a sensor for each code element from the sensor array for the main track, which is in a position to detect the code element, based on the detection signal from the relative position detecting means, and transmits the detection signal from said sensor.

The M-sequence codes of the main track according to the present invention comprise, for example, a recurring sequence formed of $2^{m-1}$ "1" and $2^{m-1}$ "0" arranged to form $2^m$ different codes of m units as described above.

For example, if one code word is expressed by 3-bit binary number, a series of M-sequence codes are formed by a sequence comprising $2^3$ "1" (white portion) and "0" (shadowed portion) as illustrated in FIG. 1. In this case, if the code elements $MP_0$ to $MP_7$ of the main track 11 are 0, 0, 0, 1, 0, 1, 1, 1 arranged in this order, a chain of different eight code words (000), (001), (010), (101), (011), (111), (110), (100) is formed.

The code elements expressing "1" and "0" are provided in association with sensors used for detection thereof. For example, the code elements are provided in the form of physical and/or chemical changes in light, magnetism, conductivity, pressure, etc. If the elements are provided in an optical form, a light and a dark portion may be associated with "1" and "0". The code elements forming code patterns are directly provided on a system for generating the positional information, for example, a rotary disc or non-circular track by punching, printing or attaching, or indirectly provided thereon by attaching or mounting sheet or tape on which the code patterns are printed.

In the present invention, relative position detecting means comprises a sub-track having discrimination elements arranged cyclically along the main track, and a sensor array for the sub-track disposed, keeping a given positional relationship with the sensor array for the main track, to detect the discrimination elements. More particularly, the relative position detecting means is so formed that each of the code elements is divided into a plurality of zones in a direction of the track by the sub-track and the sensor array for the sub-track. Thus, the relative position of each sensor of the main track sensor array within the respective code element is detected in association with the divided zones.

The sub-track is provided on the code means along the main track and it has discrimination elements which are cyclically arranged, while being associated with the respective code elements of the M-sequence codes, along the main track to divide each code element of the M-sequence codes of the main track into a plurality of zones in a direction of the track.

The discrimination elements of the sub-track are preferably formed of combinations of "1" and "0" to equally divide the respective code element of the main track into plural zones. The forms of the discrimination elements are selected in association with sensors employed for detection. For example, the discrimination elements are formed as physical or chemical changes such as changes in light, magnetism, conductivity or pressure. Preferably, they are formed similarly to the code elements on the main track.

There are many combinations of the discrimination elements according to the number of divisions. When the number of divisions is large, a plurality of tracks are provided as the sub-track means.

Where the code elements $MP_0$ to $MP_7$ of the main track are simply divided into two by elements representing "0" and "1", respectively, the sub-track comprises a track on which discrimination elements $SP_0$ and $SP_1$ of "0" and "1" recur cyclically.

Where the number of divisions is large, for example, n tracks are employed to provide combinations of n-bit patterns. These combinations of patterns may be allotted to each element to be divided. In this case, the combinations of the patterns are preferably formed, for example, of Gray code (alternating binary code) to avoid possible occurrence that a code is not defined on the boundary of the patterns.

The number of divisions by the sub-track is determined basically by the number of sensors employed for the main track or the arranged pitch of the sensors, especially by the arranged pitch of the sensors. For example, if the sensors of the sensor array for the main track are disposed over a span corresponding to the length of one code word at a pitch of (k-1) times the division pitch of the code element, the sub-track is divided into k in such a manner that each code element of the main track may be discriminated. In this case, discriminative k discrimination elements are used.

The number of divisions by the sub-track may be more or less than the number as specified above. If the number is less, the number of the discrimination pattern may be reduced. On the other hand, if the number is more, the resolution can be improved.

In this connection, it is to be noted that when the number of divisions by the sub-track alone is less than the desired number of the division of the code element, the number of the sensors for the sub-track may be increased and the sensors may be disposed at different positions in the direction of the track to detect the discrimination elements of the sub-track. This enables the number of divisions to be increased substantially.

Basically, the code words detected from the main track may be used as they are as positional information. However, according to the present invention, the discriminative division of the code elements by the sub-track and the sensors for the sub-track may be utilized to obtain positional information by the combination of the code words detected from the main track and the output signals from the sensor array for the sub-track. The latter is preferable for improvement of the resolution.

The main track and sub-track are preferably formed on the same medium in the identical manner. The formations of these tracks are dependent upon an object to be subjected to the positional information detection. In the case of a rotary disc, the main track and the sub-track may be provided concentrically as illustrated in FIG. 1, while in the case of a linear track, they may be provided in parallel.

The sensor array for the main track and the sensor array for the sub-track are selected according to the code elements to be detected. For example, optical sensors, magnetic sensors or pressure sensors may be selected in relation with the types of the code elements. The sensor arrays may be formed of discrete sensor devices or may be provided as sensor assemblies in a hybrid or monolithic form. Alternatively, both the sensor arrays may be formed integrally with each other as one assembly.

The sensor array for the main track comprises sensors more, by at least one, than the number of the code elements forming one code word. The sensor array for the sub-track comprises at least one sensor. The number of the sensors for the sub-track is different dependent upon the number of divisions and the bit number of the discrimination elements.

The pitch of the sensors of the sensor array for the main track is smaller than that of the code elements of the main track. The actual pitch is determined specifically according to the number of the sensors arranged and the manner in which the sensors are arranged. When the code elements are each divided into k, the pitch is preferably (k−1) times the divided pitch.

The sensor array for the sub-track includes a plurality of sensors for detecting the discrimination elements. These sensors are preferably arranged in such a manner that the code element to be divided into plural zones may be discriminated and detected by the combination of the output signals from the sensors.

The sensor arrays for the main track and the sub-track are connected to a known circuit for converting the detection signal into a digital signal, while amplifying the same, for example, a wave shaping circuit. The output from the wave shaping circuit is input into the sensor selecting circuit.

The sensor selecting circuit comprises, for example, a switch circuit to be controlled by an on-off control signal and a gate circuit, and it selects sensors which are not located on the boundary portion of the code elements of the main track or the sensors which are in the position to detect the relevant code element, by using the detection signals from the sensor array for the sub-track of the relative position detecting means as a control signal and connects the outputs of said sensors to the code converting circuit of a later stage.

The code converting circuit has a preliminarily set conversion table and converts the code words detected from the main track by the sensors or the combinations of the code words and the detection signals from the sensor array for the sub-track into positional information. However, if the code words or the combinations of the code words and the detection signals from the sensor array for the sub-track are used as they are as positional information, the code converting circuit may be omitted.

OPERATION OF THE INVENTION

According to the present invention, a series of M-sequence code elements which are provided on a code means and forms a chain of different code words are detected by sensors which are arranged along a main sensor so as to relatively move in the direction of the main track and the code words formed of the code elements are used as they are as positional information or they are converted by the code converting circuit into positional information. Thus, absolute positional information is obtained.

At this time, the code elements forming one code word at a given position are detected simultaneously by the sensor array comprising the sensors which are greater in number than the number of the code elements forming one code word. Therefore, the positional information generating apparatus according to the present invention is capable of immediately obtaining absolute positional information at any position, irrespective of the relative positional relationship between the main track the sensor array for the main track, notwithstanding whether the main track and the sensor array are relatively stationary when the apparatus starts to read.

In the positional information generating apparatus according to the present invention, the sensors of the sensor array for the main track are disposed over a span corresponding to the length of one code word in such a way that at least one sensor may be located for each of the code elements defining the code word to be read so as to detect the respective code element. With this arrangement, when the main track and the sensor array for the main track move relatively with respect to each other to any given relative position, all the sensors may not possibly be located simultaneously on the boundary portions between the code elements. In other words, if any sensor may possibly be located on the boundary portion of the code elements, other sensors are surely to be located on the code elements defining the relevant code word, assuring the detection of the word. Therefore, the code word to be detected is defined irrespective of the relative position between the main track and the sensor array for the main track and the position detection will not be inoperative due to lack of definition of the code word.

Further according to the present invention, the relative positional relationship between the main track and the sensor array for the main track is detected by the relative position detecting means. More specifically, the positional relationship between the sensors of the sensor array for the main track and each of the code elements forming one code word after relative movement with the main track is detected. Based on the detection signals, the sensors which are in a position to detect each code element is selected from the sensor array for the main track by the sensor selecting circuit. Thus, each of the code elements forming one code word can be surely detected at any position along the main track. Further, the output from the sensor which is located on the boundary portion of the code elements is excluded, possible mis-detection based on an uncertain signal can be avoided.

As mentioned above, according to the present invention, since the relative positional relationship between the main track and the sensor array for the main track is detected, the reading of the code elements of the main track by the sensor array for the main track is effected appropriately based on the detection signal of the relative positional relationship. Therefore, allowance of positional deviation of the code elements of the main track is not so critical.

Further according to the present invention, the code elements of the main track are discriminatably divided into a plurality of zones by the sub-track to further divide one pitch of the M-sequence code, while keeping the elements discriminatable. As a result of this, the positional information by the code word of the M-sequence code can be utilized with improved resolution. In this case, if the number of divisions is increased, the positional information can have higher resolution.

When the code converting circuit is additionally employed, the combinations of the selected detection signals for the code elements or the combination of said combination and the output signals from the sensors for the sub-track are converted, by referring to the preliminarily set conversion table, into signals representing absolute positional information, for example, values corresponding to angles or lengths, or ordinal numbers such as address.

When a code means for the positional information generating apparatus comprising the main track and the sub-track arranged along each other is used, possible positional deviation between the code elements of the main track and the sub-track for dividing the same can be avoided.

Further, when the sensor assembly comprising the sensor array for the main track and the sensor array for the sub-track is used, the relative positional relationship between the main track and the sensor array for the main track is accurately detected by the sensor array for the sub-track. Therefore, the number of divisions by the sub-track may be increased to enhance the resolution.

BRIEF DESCRIPTION OF THE DRAWINGS

FIG. 5 is an explanatory view showing contents of a code conversion table;

DESCRIPTION OF PREFERRED EMBODIMENT

Figure 1:
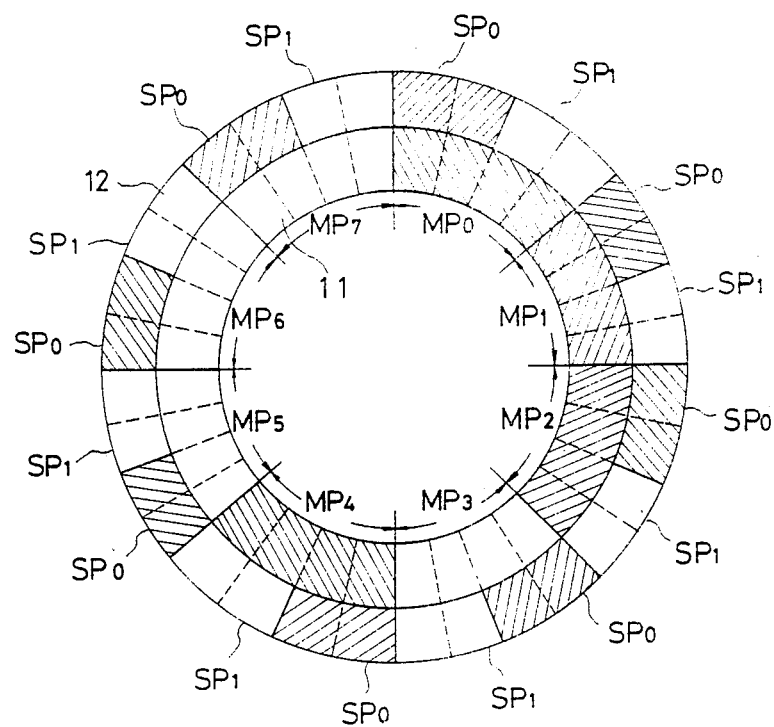
FIG. 1 is an explanatory view of one form of a code plate which forms a code means usable in the present invention.

Referring now to the drawings, preferred embodiments of the present invention will be described.

(First Embodiment)

A first embodiment of the present invention is a positional information generating apparatus for use in a rotary encoder. This embodiment employs M-Sequence code system forming a chain of eight code words. Each code element comprising the code word is divided by four to produce 32 absolute positional informations. The formation of the first embodiment is schematically illustrated in FIG. 3.

Figure 3:
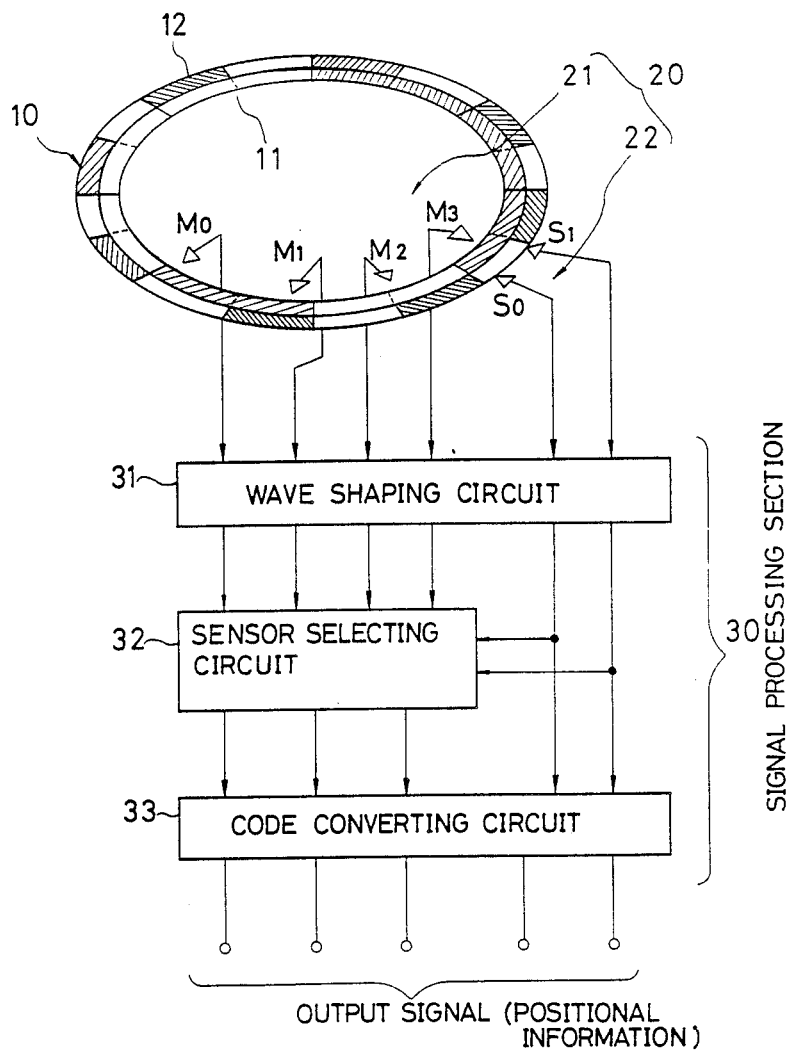
FIG. 3 is a conceptional view showing a formation of a rotary encoder to which a first form of a positional information generating apparatus embodying the present invention is applied.

The positional information generating apparatus as illustrated in FIG. 3 comprises a code plate 10 as a code array means which is formed identically with that of FIG. 1, a sensor assembly 20 including a sensor array 21 for a main track and a sensor array 22 for a sub-track, and a signal processing section 30 for processing output signals from the sensor arrays 21 and 22 to output positional information.

The code plate 10 and the sensor assembly 20 are adapted to move relatively with respect to each other.

Figure 2:
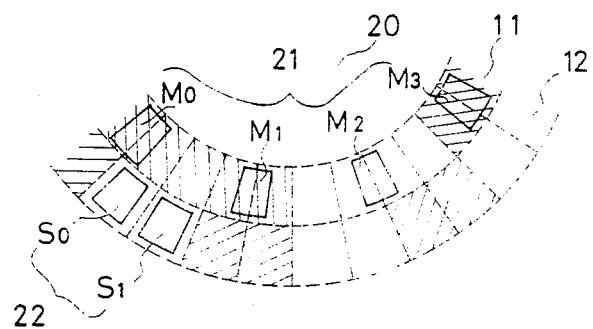
FIG. 2 is an explanatory view showing, by way of example, an arrangement of sensor assembly in relation with the code plate.

In the embodiment as illustrated, the code plate 10 is rotatable and the sensor assembly 20 is fixed. More specifically, they are arranged as illustrated in FIG. 2.

The code plate 10 consists of an inner main track 11 and an outer sub-track 12 arranged concentrically with each other. The code plate 10 has a rotation shaft at a center of the concentric circles of the main track 11 and the sub-track 12. The rotation shaft is connected to a rotor (not shown) to be subjected to detection of positional information such as a rotation angle.

The main track 11 has a code pattern similar to that of FIG. 1 in which code elements $MP_0$ to $MP_7$ are arranged to correspond to binary codes forming code words. In the present embodiment, the code elements $MP_0$ to $MP_7$ are provided in the form of an opaque portion (shadowed in FIG. 3) or a transparent portion which corresponds to "0" or "1", respectively, so as to adapt for optical detection.

The sub-track 12 is formed of discrimination elements $SP_0$ and $SP_1$ corresponding to "0" and "1", respectively, to equally divide the code element of the main track 11 into plural zones. The discrimination elements $SP_0$ and $SP_1$ are provided in the form of an opaque portion (shadowed) and a transparent portion which correspond to "0" and "1", respectively, as on the main track 11.

The number of the divisions by the sub-track 12 is 2 which is smaller than the number of sensors employed, i.e. 4, in the embodiment as illustrated. However, as the sensor array for the sub-track consists of two sensors in the present embodiment, each of the code elements $MP_0$ to $MP_7$ are divided, in effect, by four as shown by radial broken lines in FIG. 1.

The sensor array 21 for the main track comprises four sensors $M_0$ to $M_3$ and the sensor array 22 for the sub-track comprises two sensors $S_0$ and $S_1$. The sensors $M_0$ to $M_3$ and $S_0$ and $S_1$ may be photodetectors such as photodiodes or phototransistors in the embodiment as illustrated. Light sources such as light emitting diodes (not shown) are disposed for the sensors $M_0$ to $M_3$ and sensors $S_0$ and $S_1$.

As one code word of the main track is formed of three code elements as described above, the sensor array 21 for the main track comprises four sensors which is more than the number of the code elements in one word.

A pitch of the sensors $M_0$ to $M_3$ arranged in the sensor array 21 for the main track is smaller than a pitch of the code elements MP (equal to the width of the code element) of the main track 11. In the embodiment as illustrated, if the pitch of the code elements MP is assumed as 4d as shown in FIG. 4, the pitch of the sensors $M_0$ to $M_3$ and 3d which is $(4-1)$ multiple of $\frac{1}{4}$ pitch of the code elements MP because the code element is divided by four.

A pitch SP of the sensors $S_0$ and $S_1$ of the sensor array 22 for the sub-track divides the code element as described above, into two. In the present embodiment as illustrated, since the pitch of the discrimination elements SP is 2d as shown in FIG. 4, the pitch of the sensors $S_0$ and $S_1$ is d.

Figure 4:
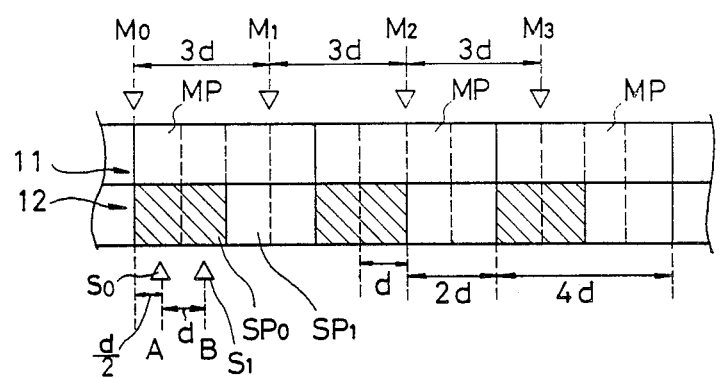
FIG. 4 is an explanatory view showing developed positional relationships between a main track, a sub-track, sensors for the main track and sensors for the sub-track.

The positional relationship between the sensor array 21 for the main track and the sensor array 22 for the sub-track is so selected that a reference position of the sensor $S_0$ is offset by d/2 (FIG. 4). This is for excluding a sensor $M_0$ to $M_3$ from reading of the code elements which is at a distance less than d/2 from a boundary line of any two adjacent code elements MP, due to the difference between the pitch of the sensors $M_0$ to $M_3$ and the pitch of the code elements MP. Therefore, the value d/2 of the offset is approximate.

The signal processing section 30 comprises a wave shaping circuit 31 for amplifying the outputs from the sensors $M_0$ to $M_3$ and $S_0$ and $S_1$ and converting the same into digital signals, a sensor selecting circuit 32 for selecting sensors from $M_0$ to $M_3$ which are not located on boundary portions of the code elements on the main track, or sensors which are at positions where they can read the respective code elements, by using outputs from the sensors $S_0$ and $S_1$ as control signals, and a code converting circuit 33 for converting a combination of code elements read by the sensors selected by the sensor selecting circuit 32 into a signal indicative of absolute positional information, referring to a table preliminarily prepared.

Figure 12:
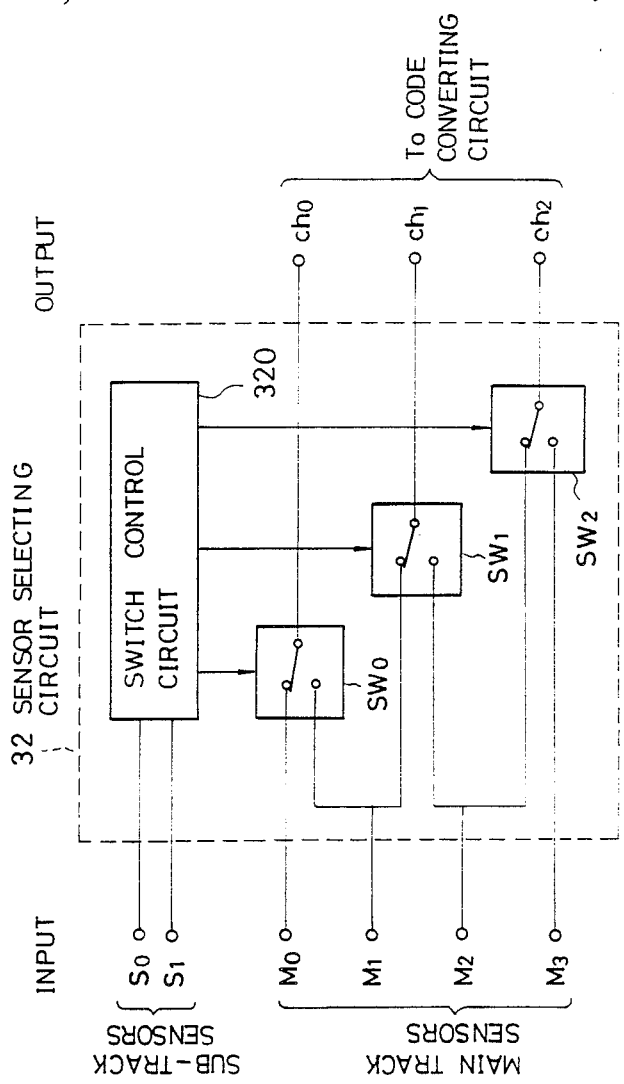
FIG. 12 is a block diagram of one form of a sensor selecting circuit employable in the positional information generating apparatus as described above.

The sensor selecting circuit 32 is formed, for example, of switches SW0, SW1 and SW2 as many as output channels ch0, ch1 and ch2, and a switch control circuit 320 comprising logic circuits as illustrated in FIG. 12. The sensor selecting circuit 32 of FIG. 12 may be applied to an apparatus having two sensors for the sub-track and four sensors for the main track.

The switch SW0 selects alternatively a signal from the sensor $M_0$ or a signal from the sensor $M_1$ to output it to the output channel ch0, switch SW1 selects alternatively a signal from the sensor $M_1$ or a signal from the sensor $M_2$ to output it to the output channel ch1, and switch SW2 selects alternatively a signal from the sensor $M_2$ or a signal from the sensor $M_3$ to output it to the output channel ch2. The alternative selection by the respective switches SW0, SW1 and SW2 is controlled by the switch control circuit 320.

Figures 13, 14:
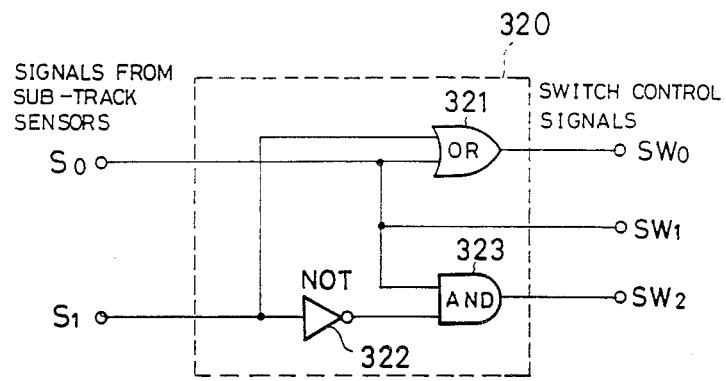
FIG. 13 is a logic diagram showing one form of switch control circuit usable for the sensor selecting circuit.
FIG. 14 is an explanatory view showing relationships between selection of effective sensors by the sensor selecting circuit and corresponding relative positions.

The switch control circuit 320 comprises an OR gate 321 for effecting logical addition of signals from the sensors $S_0$ and $S_1$ for the sub-track, a NOT gate 322 for inverting the signal from the sensor $S_1$ for the sub-track, and an AND gate 323 for effecting AND of the output from the NOT gate 322 and the signal from the sensor $S_0$ for the sub-track as illustrated in FIG. 13. The output from the OR gate 321 is used as a switch control signal for the switch SW0, the signal from the sensor $S_0$ for the sub-track is used as a switch control signal for the switch SW1 and the output signal from the AND gate 324 is used as a switch control signal for the switch SW2.

The correspondence between the signals from the sub-track and the effective sensor of the main track is summarized in a table of FIG. 14. In the embodiment as illustrated, the code elements of the code word to be read are each divided in a direction of the track into four zones. Therefore, relative positions 0 to 3 in FIG. 14 indicate the zones divided from the respective code element in the order.

Figure 15:
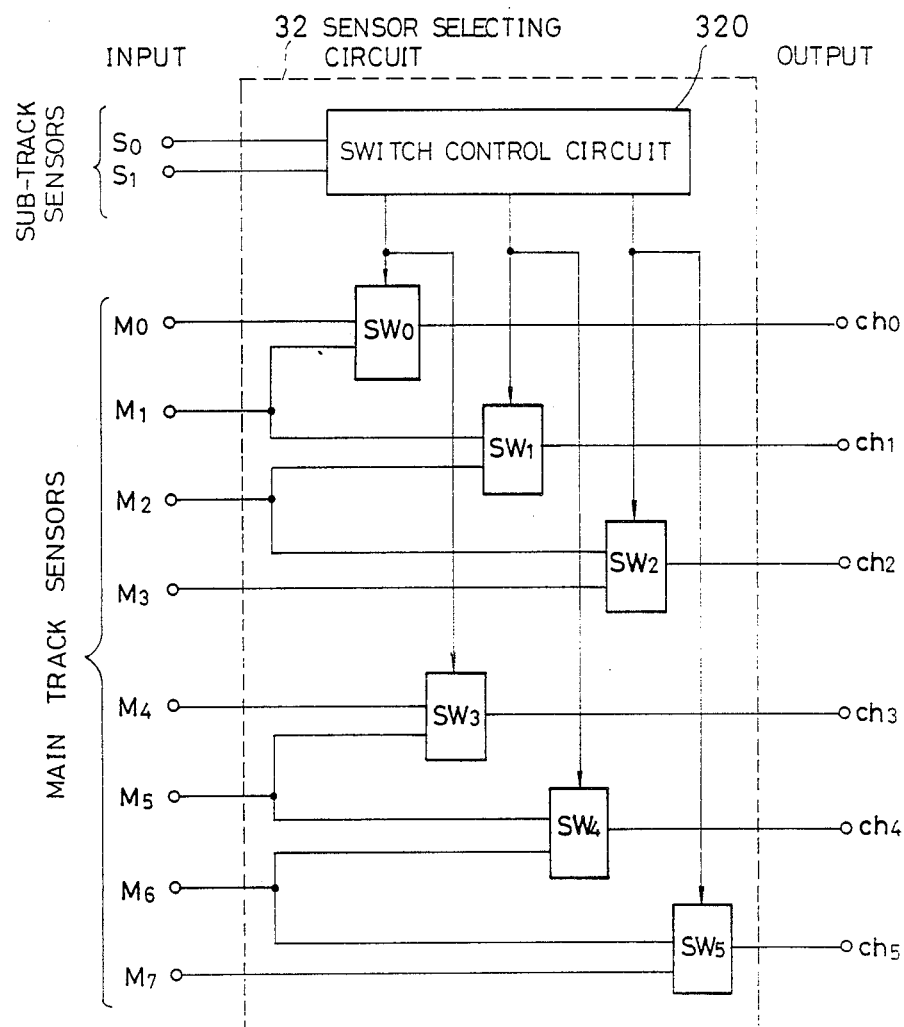
FIG. 15 is a block diagram showing a modification of the sensor selecting circuit.

In this connection, it is to be noted that the sensor selecting circuit as employed in the present embodiment may be adapted for an apparatus having more or less sensors for the main track. For example, the circuit may be formed as illustrated in FIG. 15 in which signals from eight sensors $M_0$ to $M_7$ are selectively output to six channels ch0 to Ch5.

The code converting circuit 33 comprises a storage section (not shown) for storing a conversion table and a collation section (not shown) for converting the signal from the sensors $M_0$ to $M_3$ transmitted through the sensor selecting circuit 32 and the outputs from the sensors $S_0$ and $S_1$ into positional information by referring to the conversion table. The conversion table of the embodiment as illustrated includes codes indicative of positions which correspond to combinations of the M-sequence (effective sensors of $M_0$ to $M_3$ for the main track) and the output signals from the sensors $S_0$ and $S_1$ for the sub-track. The output signals from the sensors $M_0$ to $M_3$ for the main track included in the conversion table of FIG. 5 are shown only for explanation and they may be omitted in an actual conversion table.

(Operation of the Embodiment)

An operation of the embodiment as described above will now be described.

In the present embodiment, code patterns of the main track 11 and the sub-track 12 of the code plate 10 which is rotating or at rest according to the movement or state of the rotor to be subjected to the intended positional information detection, are read by the sensor assembly 20 to detect the positional information. The positional information is generated from the code plate 10 through reading of three consecutive code elements MP of the main track 11 provided on the code plate 10 by the sensor array 21 for the main track. At this time, there may be relative movements or there may be no relative movements between the main track and the sensor array for the main track.

Each of the sensors $M_0$ to $M_3$ of the sensor array 21 for the main track and the sensors $S_0$ and $S_1$ of the sensor array 22 for the sub-track receives light transmitted through the main track 11 or the sub-track 12 which is within the sight of the respective sensors. The outputs from the respective sensors $M_0$ to $M_3$ and the sensors $S_0$ and $S_1$ are amplified and shaped by the wave shaping circuit 31 and obtained in the form of digital signals denoting "0" or "1".

At this time, the code elements MP and the discrimination elements SP comprise "0" or "1" to form code patterns. More specifically, the code elements MP and the discrimination elements SP are provided in the form of opaque portions (shadowed) or transparent portions to represent "0" or "1", respectively. With this arrangement, the elements read by the respective sensors $M_0$ to $M_3$ and sensors $S_0$ and $S_1$ are detected in the form of "high" or "low" of the levels of the outputs from the respective sensors $M_0$ to $M_3$ and $S_0$ and $S_1$. Thus, the code elements MP read by the respective sensors $M_0$ to $M_3$ and $S_0$ and $S_1$ are determined in the form of "0" or "1" based on the photo-outputs from the sensors $M_0$ to $M_3$. The determination results are logically combined to read the code words.

At this time, any of the sensors $M_0$ to $M_3$ may possibly be located on the boundary portion of any two adjacent code elements MP of the main track 11 as the relative positional relationship between the main track and the sensor array 21 for the main track may be. To solve this problem, the discrimination elements $SP_0$ and $SP_1$ of the sub-track 12 are detected by the sensor array 22 for the sub-track. The relative positional relations between the sensors $M_0$ to $M_3$ and the main track 11 are detected to select sensors which are not positioned on the boundary portions between the code elements.

This selection is carried out by the sensor selecting circuit 32. More specifically, the sensor selecting circuit 32 selects effective outputs among the outputs from the sensors $M_0$ to $M_3$ to connect them to the three input channels $Ch_0$ to $Ch_2$ of the code converting circuit 33 in a later stage.

Figure 6:
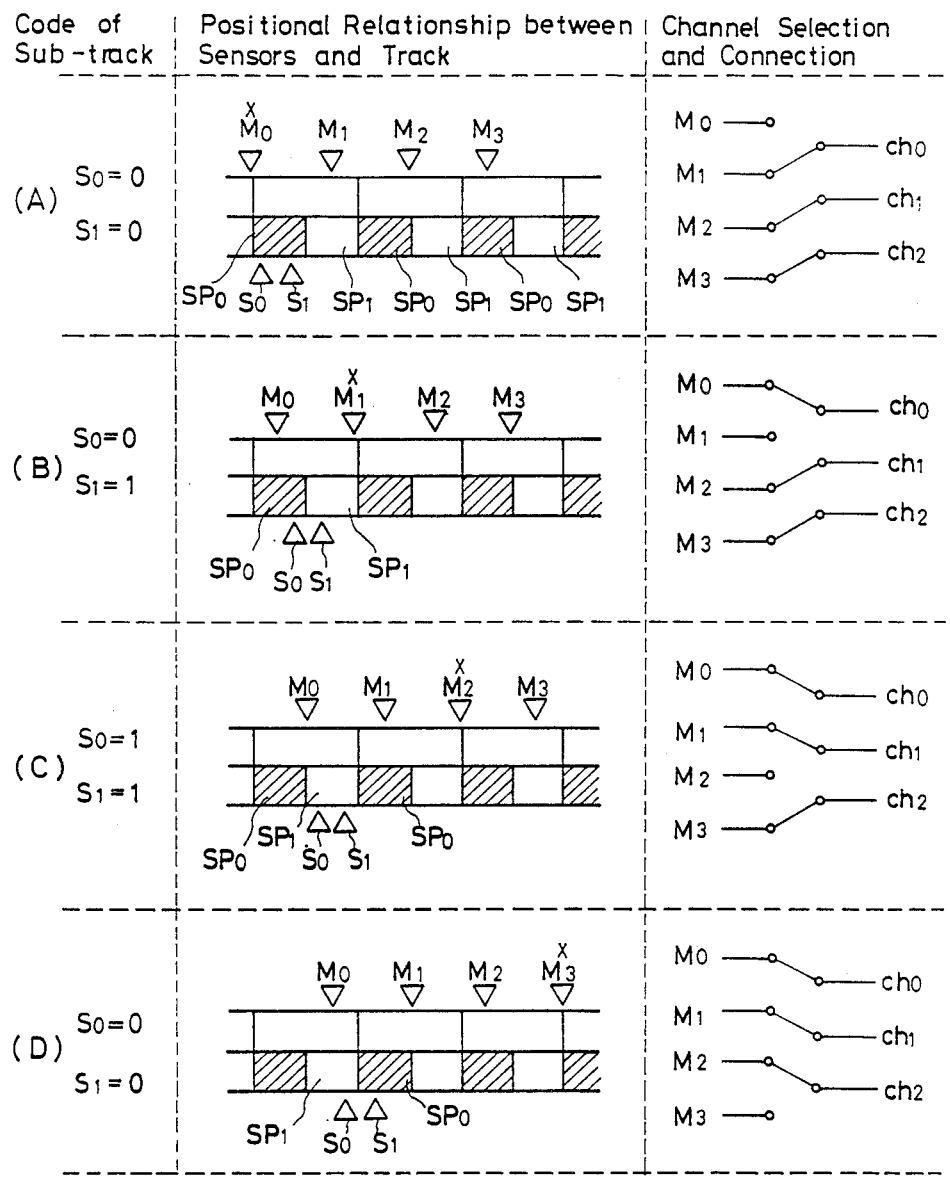
FIG. 6 is an explanatory view showing positional relationships between the main track and the sensors for the main track and corresponding channel selection.

There are four modes of relative positional relationships between the main track 11 and the sensor array 21 for the main track as shown in FIG. 6, since the code elements MP are divided by the sub-track into two and the discrimination elements of the sub-track are detected by two sensors for the sub-track as described above.

More specifically, four modes A to D shown in FIG. 6 are provided due to the specific arrangement of the embodiment as illustrated in FIG. 4 in which the pitch of the code elements MP is 4d, the pitch of the sensors $M_0$ to $M_3$ of the sensor array 21 for the main track is 3d, the pitch of the discrimination elements SP is 2d, the pitch of the sensors $S_0$ and $S_1$ is d and the position of the sensor $S_0$ is offset by d/2 from the position of the sensor $M_0$. The modes A to D are shifted sequentially whenever the main track 11 and the sensor array 21 for the main track relatively move each other by d. When they relatively move by 4d which corresponds to the pitch of the code elements MP, the next cycle will start and similar shifting of the modes will be effected.

In the embodiment as illustrated, the sensors $M_0$ to $M_3$ are sequentially located on the boundary portions of the code elements MP as in the mode A to D, respectively. The sensor selecting circuit 32 detects the mode A to D based on the relative positional relationship between the discrimination elements $SP_0$ and $SP_1$ of the sub-track 12 and the sensors $S_0$ and $S_1$ for the sub-track and selects the sensors $M_0$ to $M_3$ according to the detection results.

In the mode A, the sensor $M_0$ for the main track is located on the boundary portion of the code elements MP and one discrimination element $SP_0$ are within fields of view of both the sensors $S_0$ and $S_1$ for the sub-track. As a result of this, both the outputs of the sensors $S_0$ and $S_1$ are "0". Similarly, in the modes B to D, the sensors $M_1$, $M_2$ and $M_3$ are sequentially located on the boundary portions of the code elements MP and the outputs of the sensors $S_0$ and $S_1$ are:

Mode B ... ($S_0=0$, $S_1=1$)

Mode C ... ($S_0=1$, $S_1=1$)

Mode D ... ($S_0=1$, $S_1=0$)

Therefore, the sensor selecting circuit 32 detects the modes A to D and select combination ($M_1$, $M_2$, $M_3$), ($M_0$, $M_2$, $M_3$), ($M_0$, $M_1$, $M_3$) and ($M_0$, $M_1$, $M_2$) from the sensors $M_0$ to $M_3$ for the main track to connect the selected sensors to the corresponding input channels ch0 to ch2. The signals input to the channels ch0 to ch2 form M-sequence codes as shown in FIG. 5.

The code converting circuit 33 converts the combination of the output signals from the selected sensors $M_0$ to $M_3$ for the main track, namely, M-sequence code, into positional information. At this time, when the M-sequence codes are directly associated with the positional information, eight positional informations are obtained. However, if the combination of the output signals from the sensors $S_0$ and $S_1$ for the sub-track is further referred to, four positional informations can be obtained for each of the M-sequence codes.

Thus, according to the present invention, 0 to 31 positional informations are obtained, which can attain improved resolution higher than that attainable by eight positional informations based simply on the M-sequence codes.

If only the M-sequence codes are used as the positional information, or only the combination of the M-sequence codes and the output signals from the sensors $S_0$ and $S_1$ for the sub-track are used as the positional information, the code converting circuit 33 may be omitted. The case may include where the positional information is directly used as a discrimination signal without being converted into numerical data such as angle or length or address data such as ordinal numbers.

(Other Embodiments)

While the M-sequence codes comprising a chain of the three-bit code words formed of three code elements are employed and each of the code elements is divided into four in the first embodiment as described above, the present invention is not limited to this arrangement and the bit number of the code words or the dividing number may suitably be selected. Some modifications of the first embodiment in this respect will be given.

Figure 7:
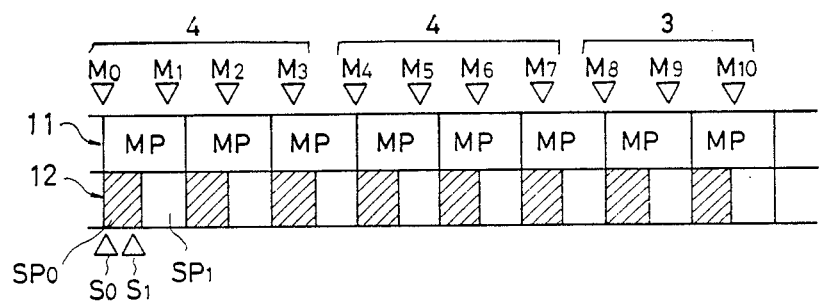
FIG. 7 is an explanatory view of another embodiment of the present invention, showing developed positional relationships between the main track, sub-track, sensors for the main track and sensors for the sub-track.

An embodiment as shown in FIG. 7 employs M-sequence codes comprising a chain of eight-bit code words formed of eight code elements and each of the code elements is divided into four.

In this embodiment, eleven sensors $M_0$ to $M_{10}$ for the main track are disposed within a range corresponding to a length of one code word, the sub-track 12 is divided into two by two discrimination elements $SP_0$ and $SP_1$ and two sensors $S_0$, and two sensors $S_0$ and $S_1$ are arranged for the sub-track to divide each of the code elements into four.

Figure 8:
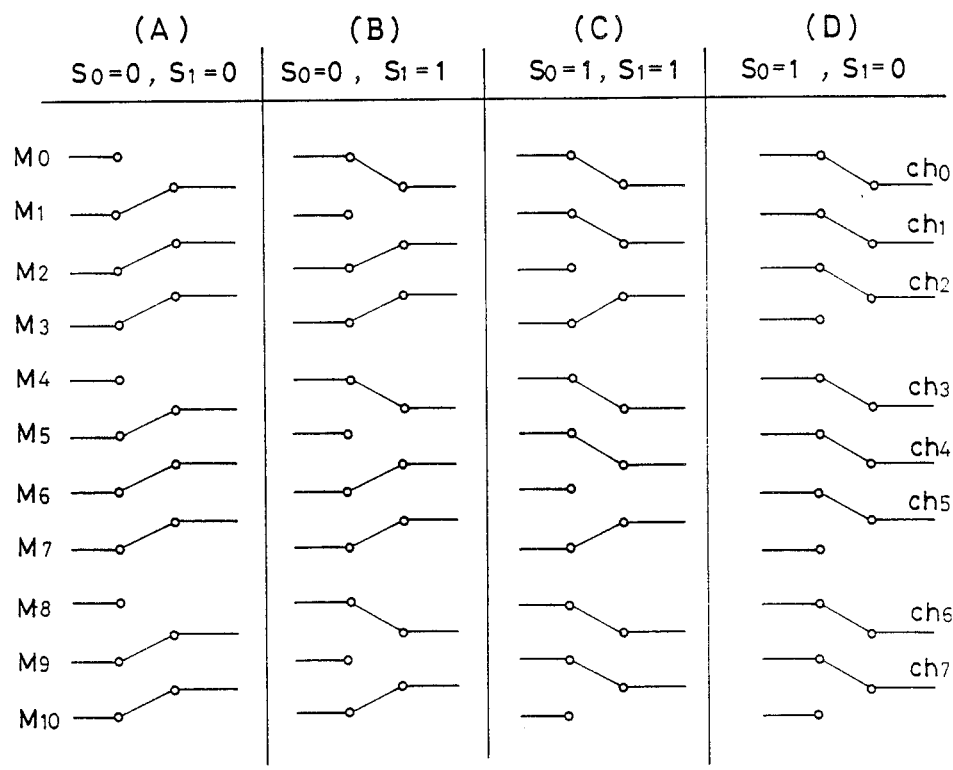
FIG. 8 is an explanatory view showing selected outputs of detection signals from the sensors for the main track shown in FIG. 7.

The detection signals from the eleven main track sensors $M_0$ to $M_{10}$ are taken out in a similar manner to that of the first embodiment. More specifically, the detection signals are subjected to the selection by the sensor selecting circuit according to combinations of the output signals from the two sub-track sensors $S_0$ and $S_1$ This embodiment also has four modes A to D as divided by four. FIG. 8 illustrates selected outputs of the detection signals from the sensors $M_0$ to $M_{10}$ for the respective modes.

In this embodiment, the number of the sensors for the main track is increased to reduce the number of the code elements forming the code word. Therefore, the code element can be small-sized up to the dividing limit of the discrimination elements of the sub-track.

Figure 9:
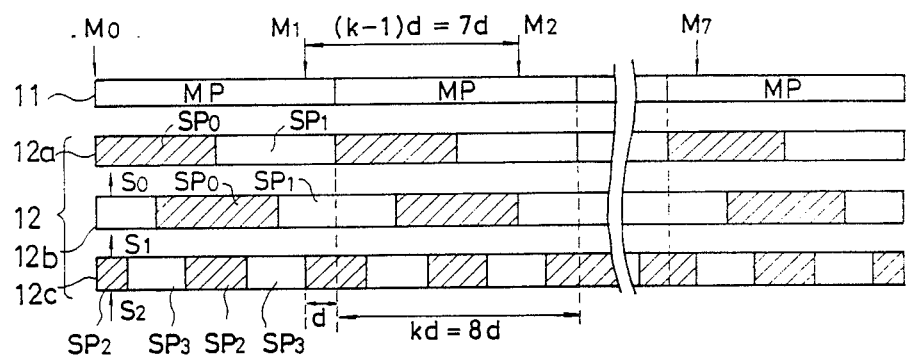
FIGS. 9, 10 and 11 are explanatory views of further embodiments of the present invention, showing positional relationships between the main track, sub-track, sensors for the main track and sensors for the sub-track.

In an embodiment as illustrated in FIG. 9, one code word is formed of (k−1) code elements. To detect the code elements by k sensors $M_0$ to $M_{k-1}$ for the main track, n sub-tracks are employed and the code element is divided into (k=$2^n$) zones by discrimination elements of n-bit Gray code provided by using n sub-tracks. More particularly, the embodiment as illustrated in FIG. 9 employs M-sequence code forming a chain of code words which is formed of 7-bit code elements and each code element is divided into eight.

In the positional information generating apparatus, if a minimum division pitch is assumed to be d, a pitch (length) of the code element is kd and a pitch of sensors arranged for the main track is (k−1)d.

In this embodiment, eight sensors $M_0$ to $M_7$ for the main track are disposed over a length of one code word. As a sub-track 12, three sub-track portions 12a, 12b, and 12c are employed. In this sub-track arrangement, the sub-track portions 12a and 12b are disposed with a phase shift and divided by two discrimination elements $SP_0$ and $SP_1$, and the sub-track portion 12c is divided into four by discrimination elements $SP_2$ and $SP_3$. As a result of this, each code element is discriminated by combination of elements of the three tracks and thus divided into eight. Sub-track sensors $S_0$, $S_1$ and $S_2$ are each provided for the sub-tracks 12a, 12b and 12c, respectively, and they are disposed at the same reference position.

The processing of the detection signals from the eight main track sensors $M_0$ to $M_7$ is substantially the same as that of the first embodiment except that the number of the sub-track sensors is different. More specifically, the detection signals are processed by the sensor selecting circuit according to the logical combination of the output signals from the three sub-track sensors $S_0$, $S_1$ and $S_2$.

Figure 10:
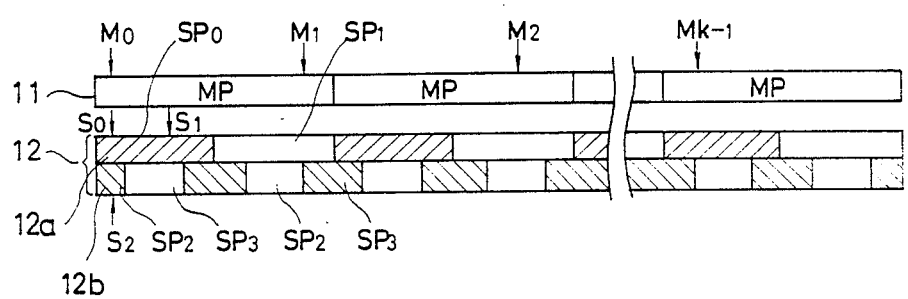

This embodiment can be modified as illustrated in FIG. 10, in which sub-track sensors $S_0$ and $S_1$ are provided for the sub-track 12a to omit the sub-track 12b.

Figure 11:
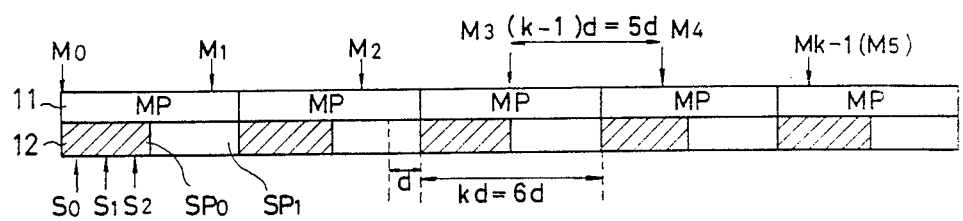

FIG. 11 shows an embodiment in which a reduced number of sub-tracks are employed and a number of sub-track sensors are disposed at predetermined pitches in the direction of the track to divide the code element. More specifically, an M-sequence code forming a chain of code words which are formed of 5-bit code elements MP and each code element of the code word is divided into six.

Stated more illustratively, six sub-track sensors $M_0$ to $M_5$ are disposed over a range corresponding to the length of one code word and the sub-track 12 is divided into two by the two discrimination elements $SP_0$ and $SP_1$, and three sub-track sensors $S_0$, $S_1$ and $S_2$ are arranged at a pitch d which is the same as the minimum division pitch to divide the code element into six.

The processing of the detection signals from the main track sensors $M_0$ to $M_5$ is similar to that of the first embodiment except that the number of the sub-track sensors is different. More specifically, the processing is carried out by the sensor selecting circuit, based on the logical combination of the output signals from the sub-track sensors $S_0$, $S_1$ and $S_2$.

Although the positional information generating apparatus is applied to the rotary encoder in the foregoing embodiments, the present invention may further applicable to various uses. For example, it may be applied to a linear encoder, or positioning of an X-Y travelling table in a machine tool.

As described above, the present invention eliminates the possibility that a position can not be detected because the code word can not be defined. In addition, the present invention can realize a positional information generating apparatus which is capable of detecting the position immediately after starting reading. This, in turn, allows the apparatus to be of high resolution, of small size and easy to form code elements.

Further according to the present invention, there can be provided a code means suitable for the positional information generating apparatus as described above.

We claim:

1. A positional information generating apparatus including code means having a main track with M-sequence codes forming a chain of different code words and sensor means disposed for attaining relative movement with reference to a direction of the main track whereby a code word is detected from the main track by the sensor means for generating positional information, which apparatus comprises:

a sensor array for the main track in which a number of sensors, greater than the number of code elements forming one code word, are disposed over a span corresponding to a length of one code word, at least one sensor located on each code element to define a code word to be read;

a relative position detecting means for detecting a relative positional relationship between the sensor array for the main track and the main track and producing a detection signal; and a sensor selecting circuit means for selecting a sensor for each code element from the sensor array for the main track, in response to said detection signal from the relative position detecting means, said sensor selecting circuit comprising means for conveying a signal from each selected sensor to define the detected code word.

2. A positional information generating apparatus as claimed in claim 1, in which said relative position detecting means comprises a sub-track having discrimination elements arranged cyclically along the main track, and a sensor array for the sub-track disposed to detect the discrimination elements, said sensor array for the sub-track disposed in predetermined positional relationship with the sensor array for the main track.

3. A positional information generating apparatus as claimed in claim 2, wherein each of the code elements is divided into a plurality of zones in a direction of the track in relation to the sub-track and the sensor array for the sub-track, whereby the relative position of each sensor of the main track sensor array within the respective code element is detected in association with the divided zones.

4. A positional information generating apparatus as claimed in claim 1, which further comprises a code converting circuit for converting the code word detected from the main track into positional information.

5. A positional information generating apparatus as claimed in claim 1, which further comprises a code converting circuit which translates the code word detected from the main track and an output signal from the sensor array for the sub-track into positional information.

6. A code means for positional information generating apparatus which comprises a main track having M-sequence codes forming a chain of different code words disposed thereon, and a sub-track having discrimination elements arranged cyclically along the main track.

7. A code means for positional information generating apparatus as claimed in claim 6, in which said discrimination elements of the sub-track are cyclically arranged along the main track to divide each code element of the M-sequence codes of the main track into a plurality of zones in a direction of the track.

8. A code means for positional information generating apparatus as claimed in claim 7, in which the number of zones divided by the sub-track is related to pitches of the sensors of the sensor array for the main track.

9. A positional information apparatus as claimed in claim 1, in which said relative position detecting means comprises a sub-track that divides each of the code element pitches of the main track into k zones of equally divided widths and a sensor array for the sub-track, and the sensors of the sensor array for the main track are disposed, over a span corresponding to a length of one code word, at a pitch which is about (k−1) times the divided pitch of the code element.

* * * * *